May 19, 1936.  W. R. MENZIES  2,041,081
ROCKET ENGINE
Filed Oct. 6, 1934
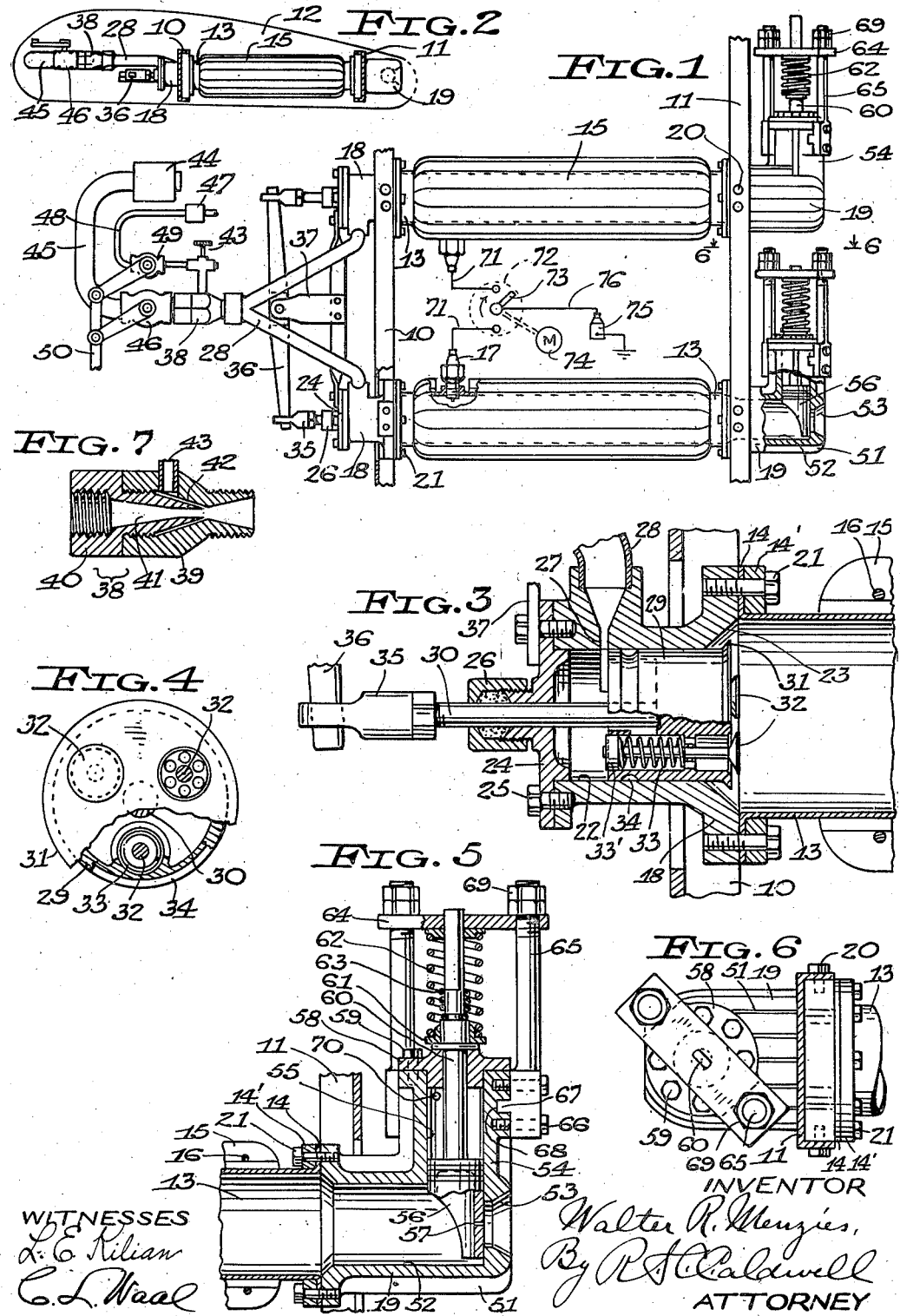
INVENTOR
Walter R. Menzies,
By R. S. Caldwell
ATTORNEY
WITNESSES
L. E. Kilian
C. L. Waal Patented May 19, 1936

2,041,081

UNITED STATES PATENT OFFICE 2,041,081

ROCKET ENGINE

Walter R. Menzies, Milwaukee, Wis.

Application October 6, 1934, Serial No. 747,129

6 Claims. (Cl. 244—18)

The invention relates to engines of the internal combustion type and more particularly to rocket engines.

An object of the invention is to provide a rocket engine of simple, durable and efficient construction suitable for the propulsion of high altitude aircraft and other bodies, and so arranged as to facilitate mounting in wings or other supports.

The invention further consists in the several features hereinafter described and claimed.

One form of the invention is illustrated in the accompanying drawing, in which

Fig. 1 is a top plan view of a rocket engine constructed in accordance with the invention, parts being broken away and parts being shown in section;

Fig. 2 is a side elevation of the engine as it appears when mounted in an airplane wing;

Fig. 3 is a sectional view of the inlet end of one of the combustion chambers;

Fig. 4 is an end view, partly in section of one of the inlet valves;

Fig. 5 is a sectional view of the exhaust end of one of the combustion chambers;

Fig. 6 is a sectional view taken on the line 6—6 of Fig. 1, and

Fig. 7 is a sectional view of a charge mixing device for the engine.

In the drawing, the numerals 10 and 11 designate a pair of spaced parallel channel bars forming engine supports, and in the present instance constituting frame members of an airplane wing 12, the channel bars extending transversely of the direction of flight.

A pair of spaced parallel combustion tubes 13 extend between the channel bars substantially in the direction of flight and each has out-turned flanges 14 at its front and rear ends. Cooling fins 15 are secured to each tube in any suitable manner, as by clamping rings 16; and an ignition device, such as a spark plug 17, is mounted near the front end of each tube.

At its front end each tube is secured to a respective inlet head 18, and at its rear end to an exhaust head 19, the exhaust heads being arranged near the trailing edge of the wing 12. The channel bars are apertured to receive the heads therethrough and each of the heads has a portion fitting between the flanges of the respective channel bar and secured thereto by screws 20. Each combustion tube has its end flanges fitting against the heads and secured thereto by screws 21 passing through the flanges and through clamping rings 14' engaging the flanges.

Each inlet head 18 has a bore 22 coaxial with the attached combustion tube, the bore having a conical shoulder 23 adjacent the tube. The outer end of the bore is closed by a cover 24 secured to the head by screws 25 and having a stuffing box 26. A slot-like arcuate inlet port 27 is formed in each head 18 in communication with the bore 22, and an inlet manifold 28 is secured to the two inlet heads to conduct a fuel charge to the inlet ports.

A piston valve 29 is slidable in the bore 22 of each inlet head 18 and has a stem 30 passing through the stuffing box 26. The inner end of the piston valve has a flange 31 engageable with the conical shoulder 23 of the head to limit the closing movement of the valve. The piston valve 29 has mounted therein a plurality of check valves 32 of the poppet type, each closed by a coiled spring 33 engaging a collar 33' on the valve. Each check valve 32 is opened by charge pressure, as hereinafter described, and each piston valve has suitable passages to conduct the charge to the check valves. At its inner position, the piston valve opens the inlet port 27, and at its outer position the valve closes the inlet port. A peripheral groove 34 is formed about the piston valve to register with the inlet port when the valve is closed.

The stems 30 of the piston valves 29 have respective eyed end members 35 which are engaged by the opposite ends of a rocker arm 36 pivoted at its midpoint on a bracket 37 secured to the inlet heads 18. By means of the rocker arm, one piston valve is at one end of its travel when the other valve is at the opposite end of its travel.

The inlet manifold 28 has mounted thereon a charge mixing device 38 of any suitable type, here shown to have a body 39 to which is secured a throat member 40 to form a central air venturi 41, a converging liquid fuel passage 42 being formed between the body and throat member to discharge into the venturi. A needle valve 43 supplies liquid fuel, such as gasoline, to the mixing device.

Air is supplied to the mixing device by a compressor or supercharger 44 connected to the mixing device by a conduit 45 which has a control valve 46. Fuel is supplied to the mixing device by a pump 47 connected to the needle valve 43 by a conduit 48 having a control valve 49. The air and fuel control valves are actuated by a common control rod 50 so that both valves will open simultaneously.

Each exhaust head 19 is provided with suitable cooling ribs 51 and has a central bore 52 coaxial with the corresponding combustion tube and with a rearwardly opening exhaust port or nozzle 53. The exhaust head has a lateral extension 54 provided with a bore 55 in which a piston valve 56 is slidably mounted, the piston valve having a hollow skirt cutaway portion to cover the exhaust port 53. The cut-away skirt portion of the piston valve 56 slidably bears against a seat which surrounds the exhaust port and forms an extension of the cylindrical surface of the bore 55. To facilitate starting of the engine from cold, a small bleed opening 57 may be formed in the piston valve to register with the exhaust port, although this opening may be omitted, if desired. A cover 58 closes the outer end of the bore 55 and is secured to the head by screws 59. The piston valve 56 has a stem 60 passing through the cover 58 and is shouldered to receive a spring seat 61 for a compressed coiled spring 62. A reduced part of the valve stem is shouldered and peripherally grooved to receive a cushion spring 63 anchored on the stem and disposed within the spring 62. The outer end of the stem is flatted and is slidably guided against rotation in a cross bar 64 adjustably mounted on a pair of bolts 65 secured to the exhaust head by screws 66, each bolt having a rib or projection 67 engaging in a notch 68 formed in the head. The cross bar 64 forms a bearing for the outer end of the coiled spring 62, the compression of the spring being adjusted by bar-engaging nuts 69 on the bolts 65. The exhaust head is lubricated in any suitable manner, as by means of a lubricator connection 70.

The spark plugs 17 are connected by conductors 71 to the terminals of a distributor 72, the rotor 73 of which is driven by an adjustable speed electric motor 74. An ignition coil 75 is connected to the rotor by a conductor 76.

In operation, fuel charges are introduced into the combustion tubes from the inlet heads 18, and the electric motor 74 is started to drive the rotor of the ignition distributor. The charge in one combustion tube will eventually fire, causing the inlet piston valve 29 in this tube to move in its bore 22 until the shoulder 31 of the valve engages the conical shoulder 23 of the inlet head, and also causing the check valves 32 to close if they are not already closed. The explosion pressure moves the exhaust piston valve 56 against the action of the spring 62, thereby exposing the exhaust post 53 and permitting a gas blast to pass rearwardly through the exhaust port and to exert a propulsive effect. The exhaust valve 56 is urged against the seat around the exhaust port by explosion pressure at the initial stage of the explosion, thereby frictionally retarding the movement of the valve from its closed position and delaying the actual opening of the valve until the explosion pressure rises to an effective valve. The opening movement of the exhaust valve is cushioned by the coiled spring 63 striking the plate 64, and also by the air trapped in the bore 55 in which the exhaust valve 56 travels. The exhaust valve closes when the gas pressure drops.

The inlet piston valve 29 on its closing movement covers the inlet port 27 and places this port in register with the peripheral groove 34 in the valve to equalize lateral pressure on the valve. The closing movement of this inlet piston valve swings the rocker arm 36 and thereby opens the other inlet piston valve, uncovering the inlet port 27. The charge pressure opens the check valves 32 of the open piston valve when this pressure exceeds the pressure in the tube, and the compressed charge thereupon enters the combustion tube. Ignition of the charge then takes place, and the cycle of operation is repeated. The check valves 32 close as soon as the pressure in the tube becomes about equal to the charge pressure. The timing and frequency of the explosions are controlled by the adjustable speed ignition distributor.

The reaction of the exhausting jets of gases of combustion serves to propel the airplane or other body. Since the gas is under compression when ignited, the efficiency is somewhat better than that obtained with combustion chambers of the open type.

Each piston valve 29 determines the maximum portion and most favorable portion of each cycle that the charge may be admitted to the corresponding combustion tube, so as to avoid unnecessary loss of charge during any part of the rest of the cycle. The check valves 32 in each piston valve, however, determine the actual interval of charge admission, which interval will vary according to the speed of the motor and other conditions, these check valves also avoiding backfiring into the bores 22 and charge manifold 28.

While only one engine unit is illustrated, it is obvious that any desired number of units may be mounted on the airplane.

What I claim as new and desire to secure by Letters Patent is:

1. An engine comprising a combustion tube having a charge inlet at one end and an exhaust outlet at the other end, the inlet end of said tube having a head provided with a bore, there being an inlet port in said bore, a piston movable in said bore for covering and exposing said port and being urged to port-closing position by explosion pressure in said tube, and a check valve carried by said piston for admitting a charge into the tube in the interval in which said port is exposed.

2. An engine comprising a combustion tube having a charge inlet port and an exhaust outlet, a movable inlet valve member for closing and exposing said port and being urged to port-closing position by explosion pressure in the tube, means for moving said valve member to port-exposing position, and a check valve carried by said valve member for admitting a charge into the tube only in the interval in which said member has exposed said inlet port.

3. An engine comprising a combustion tube having an exhaust port at one end opening in alignment with the tube and having a laterally extending bore adjacent said port, there being a valve seat about said port, and a gas-pressure-operated piston valve slidable in said bore transversely of the tube and having a side portion projecting into the tube and slidably engaging said seat for covering and exposing said port, said side portion of the valve being urged against said seat by explosion pressure to retard the opening movement of the valve.

4. An engine comprising a combustion tube having a charge inlet port and an exhaust outlet, means for supplying a compressed charge to said inlet port, a movable inlet valve member for closing and exposing said port and being urged to port-closing position by explosion pressure in the tube, means for moving said valve member to port-exposing position, and a check valve carried by said valve member for admitting a charge into the tube when said valve member has exposed said inlet port, said port when closed preventing access of the compressed charge to said check valve.

5. An engine comprising a combustion chamber having an exhaust port and a seat about said port, and a gas-pressure-operated slide valve movable along said seat to expose said port and urged against said seat by explosion pressure to retard the opening movement of said valve.

6. An engine comprising a combustion chamber having an exhaust port and a bore adjacent said port, there being a valve seat about said port, and a gas-pressure-operated piston valve slidable in said bore and slidably engaging said seat to cover said port, said piston valve having a portion urged against said seat by explosion pressure to retard the opening movement of the valve.

WALTER R. MENZIES.